April 27, 1937.    A. C. DE LORME    2,078,629
CONTROL DEVICE
Filed Nov. 10, 1934
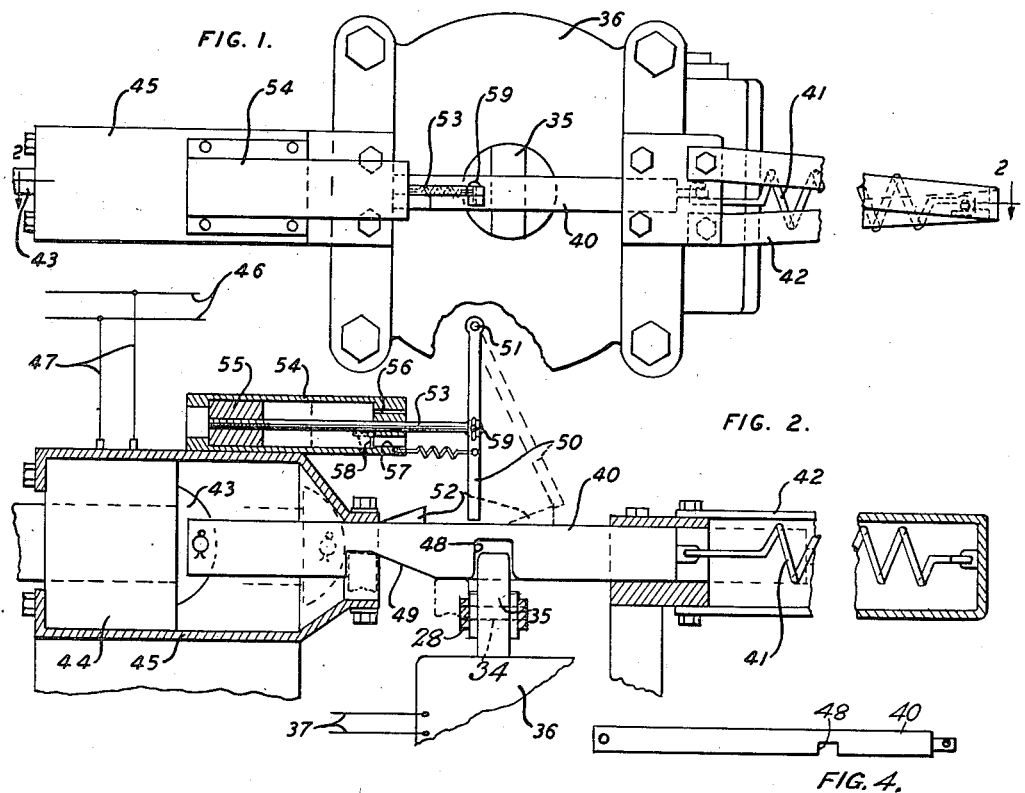
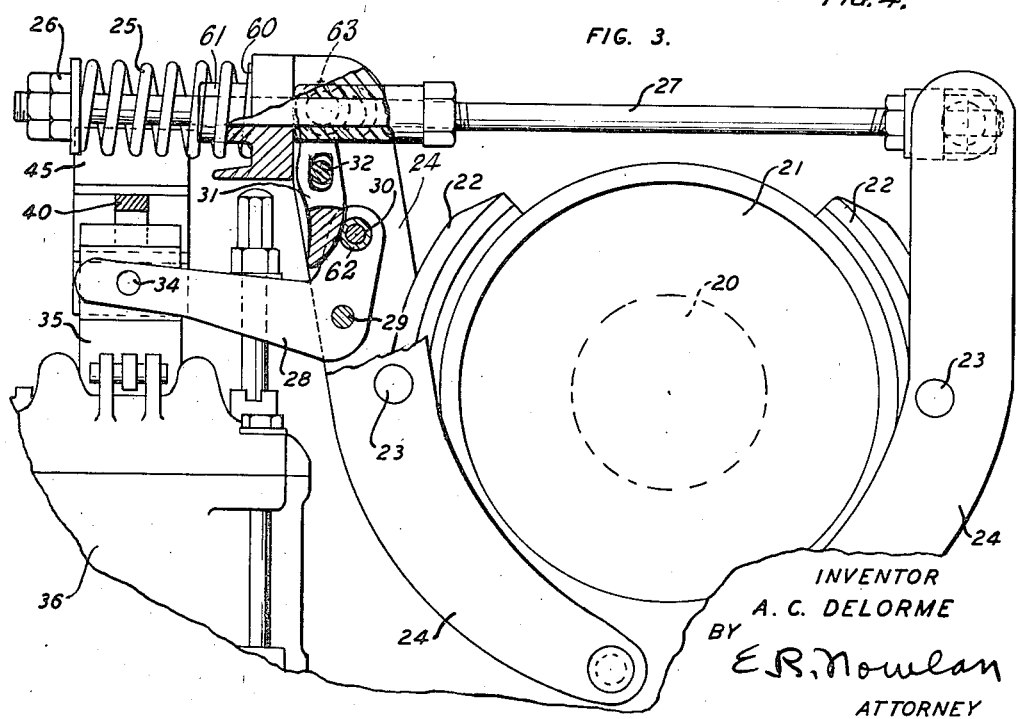
INVENTOR
A. C. DELORME
BY
E. R. Nowlan
ATTORNEY Patented Apr. 27, 1937

2,078,629

UNITED STATES PATENT OFFICE 2,078,629

CONTROL DEVICE

Alfred C. DeLorme, Maplewood, N. J., assignor to Western Electric Company, Incorporated, New York, N. Y., a corporation of New York Application November 10, 1934, Serial No. 752,434

6 Claims. (Cl. 188—171)

This invention relates to a control device and more particularly to a device for emergency control of massive machinery.

There are many kinds of machinery provided with automatically operating braking devices which are designed to become operative upon the occurrence of one or another predetermined event, to bring the machine in question to a stop. In some instances in the more modern types of machines having individual electric drive, the braking device comprises essentially spring pressed brake members held in inoperative position by an electrically actuated device such as a solenoid, which releases the brake members to become operative upon the occurrence of the predetermined event. In the case of massive and rapidly moving machines, this release must be gradual so that the brake will take hold gradually and not occasion excessive stresses due to the great inertia and momentum of the machine. However, in such apparatus, a failure of the current supplied to the solenoid or other brake inhibiting member, may permit the brake to act abruptly and to apply its full effect all at once with disastrous results to the machine as a whole.

It is one object of the present invention to provide means in such automatic braking devices, whereby a failure of current to the braking device itself will not be permitted to cause the braking device to exert its full effect abruptly or in some cases at all.

One embodiment of the invention may be in auxiliary means applied to a well known electrically powered drive for rotating massive machinery which includes as braking means a pair of pivotally mounted brake shoes spring pressed to act on an appropriately connected brake drum and held apart in inoperative position by a camming lever actuated by a solenoid. Means are provided so that when a predetermined event occurs the solenoid will gradually yield to the spring and so allow the brake to become gradually effective, thus bringing the machine gradually to a standstill without undue inertia strain. However if, due to any accident, the current to the solenoid fails, the brake will be abruptly applied at full effect and dangerous stresses may be occasioned. Hence the present invention contemplates means such as a secondary solenoid actuating a spring actuated stop means which the second solenoid holds in inoperative position, but which, if the current fails, will become operative to prevent instant actuation of the brake at full effect.

The above and other objects and characteristic features of the invention will appear from the following detailed description of one embodiment of the invention as applied to the brake means of a machine, taken in connection with the accompanying drawing in which like reference numerals are applied to identical parts in the several figures and in which Fig. 1 is a broken plan view of an auxiliary brake control device constructed in accordance with the invention, Fig. 2 is a broken view thereof in side elevation as mounted on the principal brake solenoid, Fig. 3 is a view in end elevation of the principal brake members and the principal solenoid with the auxiliary device thereon in transverse section, and Fig. 4 is a detached side view of a modified form of stop member.

In the embodiment herein disclosed a shaft 20 (Fig. 3) of a large and massive mechanism (not shown) has a brake drum 21 mounted thereon. A pair of brake shoes 22, 22 is pivotally mounted at 23, 23 on pivotal pairs of lever arms 24, 24 to be applicable to the drum under the pressure of a compression spring 25 bearing at its left end against a tension adjustment nut 26 threadedly mounted on a pull rod 27 which extends through the slotted upper end of the left arm 24 and is secured to the upper end of the right arm 24. The right end of the spring 25 bears against a shoulder 61 formed on a sleeve 60 sliding on the rod 27 and bearing against the upper ends of the left arms 24. Thus the spring 25 tends to force the upper ends of the levers 24, 24 together and to press the shoes 22, 22 against the drum 21.

A bell crank lever 28 is pivoted at 29 between the upper parts of the left hand levers 24, and its upper end carries a cam pin 30 having a cam roller 62 thereon which bears against the lower end of a stirrup shaped lever 31 pivoted at 32 between the left hand levers 24. The upper ends of the lever 31 are pivotally attached at 63 to a sleeve 33 adjustably mounted on the pull rod 27.

The outer end of the horizontal arm of the bell crank lever 28 is attached at 34 to the vertically reciprocable plunger 35 of a solenoid 36 which is fed from a control box (not shown) with electric current through wires 37.

Depression of the horizontal arm of the lever 28, forces the cam roller 62 to press the lower end of the lever 31 to the left. This action forces the pivot 32 and with it the left hand arms 24 to the left, and the pins 63 and with them the sleeve 33, the rod 27 and the right hand arms 24 to the right, compressing the spring 25 and releasing the pressure of the brake shoes 22 on the drum 21.

All the mechanism thus far described is well known and widely distributed and used. In operation, when the machine is running and it is desired to bring it to a stop, current is cut off from the drive motor (not shown) and the machine begins to slow down due to the braking effect of the now driven motor acting as a generator. This effect decreases with dimensioning speed and means are provided in the automatic control, such as a governor operated switch, whereby when the speed has fallen off to a predetermined value, current is cut off from the solenoid 36, which permits the plunger 35 to rise. The bell crank lever 28 rocks clockwise allowing the cam lever 31 to rock counterclockwise and the spring 25 to force the arms 24, 24 together thus applying the brake shoes 22, 22 to the drum 21.

Whenever the machine is running, the solenoid 36 is energized and the brake is held inoperative. Now if by accident, the current supply to the entire machine or to the solenoid 36 should fail, the brake would immediately go on under the full pressure of its actuating spring 25 and the resulting stresses due to the full speed momentum of the massive machinery conflicting with the full retarding effect of the brake might seriously injure or even wreck the machine.

The present invention provides means to obviate this possibility which comprise a stop bar 40 mounted horizontally transversely over the upper extremity of the plunger 35 of the solenoid 36, in such a way as ordinarily to prevent the plunger 35 from rising and thus preventing the brake from being applied. The bar 40 is longitudinally slidable and has one end of a tension spring 41 secured to the right end thereof, the other end of the spring being secured to the far end of a housing 42 mounted on any convenient stationary support. This spring 41 tends to draw the bar 40 to the right (Figs. 1 and 2). The other end of the bar 40 is secured to the core 43 of a solenoid having a winding 44 and a housing 45 supported on any convenient stationary member. The solenoid winding is connected across the main power supply leads 46, 46 by lines 47, 47 so that the solenoid is energized at all times whether the machine be in motion or not, unless the current supply fails. This solenoid 43, 44 holds the bar 40 against the pull of the spring 41 in the extreme left position of the bar 40 as shown in full lines in Fig. 2.

The bar 40 has a notch 48 in its under side which, when the bar is in the full line position of Fig. 2, is in registry with the upper end of the plunger 35 and permits the plunger to rise to actuate the brake. Thus so long as there is current in the mains 46 the bar 40 makes no change in the operation of the machine as described above. However, if the machine is running with the plunger 35 down and the brake consequently off and a current failure occurs, the bar 40 will slide to the right and stop the plunger 35 from rising and hence will prevent the brake from being actuated.

In one form of the invention the bar 40 has no notches or recesses in its under surface except the notch 48, and in this case, when the power supply fails, the brake is prevented from coming into action at all and the machine "dies down" under its own internal friction.

To provide means for allowing the brake to come gradually into effect another form of the invention has a cam notch 49 cut in the under side of the bar 40 a little distance to the left of the notch 48. A lever 50 is pivoted above the bar 40 at 51 to any convenient stationary support and a shoulder 52 is formed on the upper side of the bar to coact with the bottom end of the lever 50, being located when the solenoid winding 44 is energized and the bar 40 is in its extreme left hand position, as far to the left of the lever 50 as the right hand edge of the notch 49 is from the left side of the notch 48. The plunger or piston rod 53 of a dashpot having a cylinder 54, piston 55, air outlet 56, air inlet 57, and inlet valve 58, is attached to the lever 50 by a pin 59 in a slot in the lever.

Now should the power supply fail while the plunger 35 is down, the bar 40 will be pulled to the right by the spring 41, the solenoid winding 44 being deenergized. The plunger 35 rises against the bar 40 between the notches 48 and 49, the bar being momentarily checked by the stop shoulder 52 coming against the lever 50. The bar 40 will then move slowly to the right as the spring 41 overcomes the resistance of the dashpot, and the plunger 35 will rise slowly along the slanting bottom of the notch 49 permitting the brakes to come on with equal gradual deliberation.

It is not essential that the solenoid 44 be connected across the main supply wires so long as it is so connected in any of the power supply or control circuits as to be energized whenever the machine is in motion.

The embodiment herein disclosed is illustrative merely and may be modified and departed from in many ways without departing from the scope and spirit of the invention as pointed out in and limited solely by the appended claims.

What is claimed is:

1. In an electrically driven machine, normally operative brake means, and normally operative electrically actuated means to maintain the brake means inoperative, in combination with normally inoperative means rendered effective by failure of current to the machine to prevent operation of the brake means.

2. In an electrically driven machine, normally operative brake means, and normally operative electrically actuated means to maintain the brake means inoperative, in combination with normally inoperative means rendered effective by failure of current to the machine to prevent sudden and permit gradual operation of the brake means.

3. In an electrically driven machine, normally operative brake means, and a solenoid having a plunger to maintain the brake means inoperative, in combination with a stop member rendered effective by failure of current to the machine to move from an inoperative position to an operative position in which it prevents the plunger from allowing the brake means to operate.

4. In an electrically driven machine, normally operative brake means, and a solenoid having a plunger to maintain the brake means inoperative, in combination with a stop member rendered effective by failure of current to the machine to move from an inoperative position to an operative position in which it prevents the plunger from allowing the brake means to operate suddenly and into a third position in which it allows the plunger to move slowly to allow the brake means to operate gradually.

5. In an electrically driven machine, a normally operative brake, a solenoid having a plunger operative in one position to prevent and in another position to permit operation of the brake, a stop member movable into a first position to prevent the plunger from moving to permit operation of the brake and into a second position to permit the plunger to move to permit operation of the brake, and a second solenoid to move the stop member from the first position thereof to the second position, the winding of the second solenoid being connected across the main power supply to the machine.

6. In an electrically driven machine, a normally operative brake, a solenoid having a plunger operative in one position to prevent and in another position to permit operation of the brake, a stop member movable into a first position to prevent the plunger from moving to permit operation of the brake and into a second position to permit the plunger to move to permit operation of the brake, a second solenoid to move the stop member from the first position thereof to the second position, and a spring to move the stop member from the second position thereof to the first position when the second solenoid is deenergized, the winding of the second solenoid being connected across the main power supply to the machine.

ALFRED C. DE LORME.